Oct. 11, 1960
J. W. RHODES
2,955,412
GAS TURBINE NOZZLE CONTROL
Filed Jan. 17, 1957
2 Sheets-Sheet 1
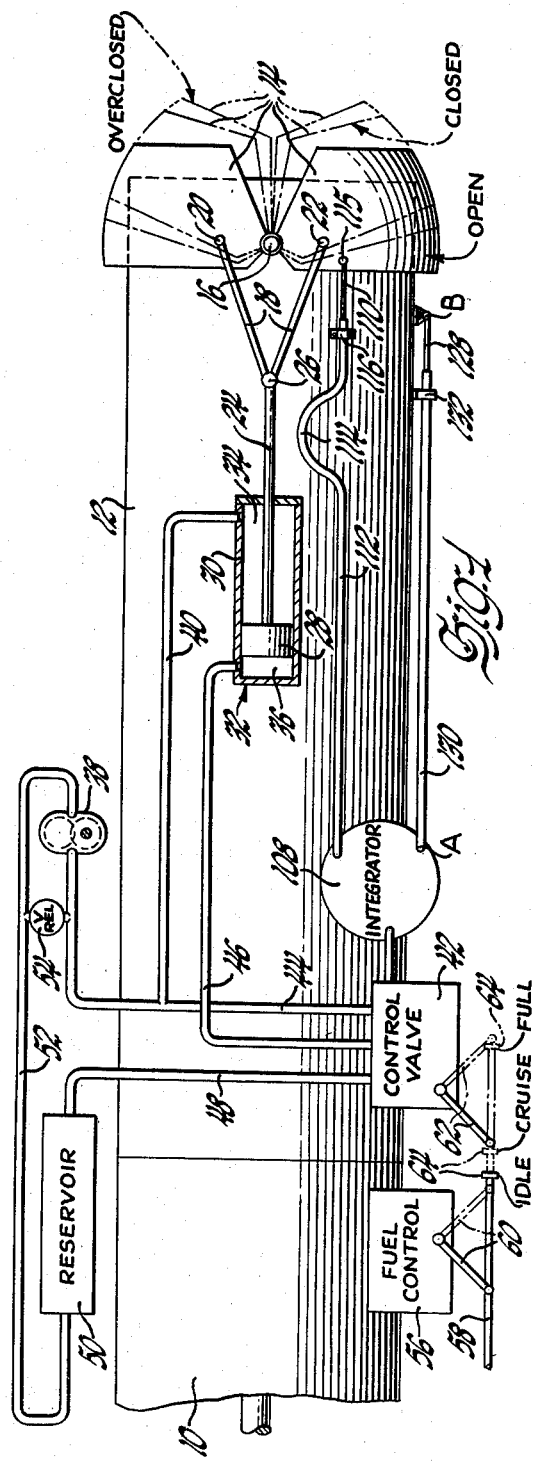
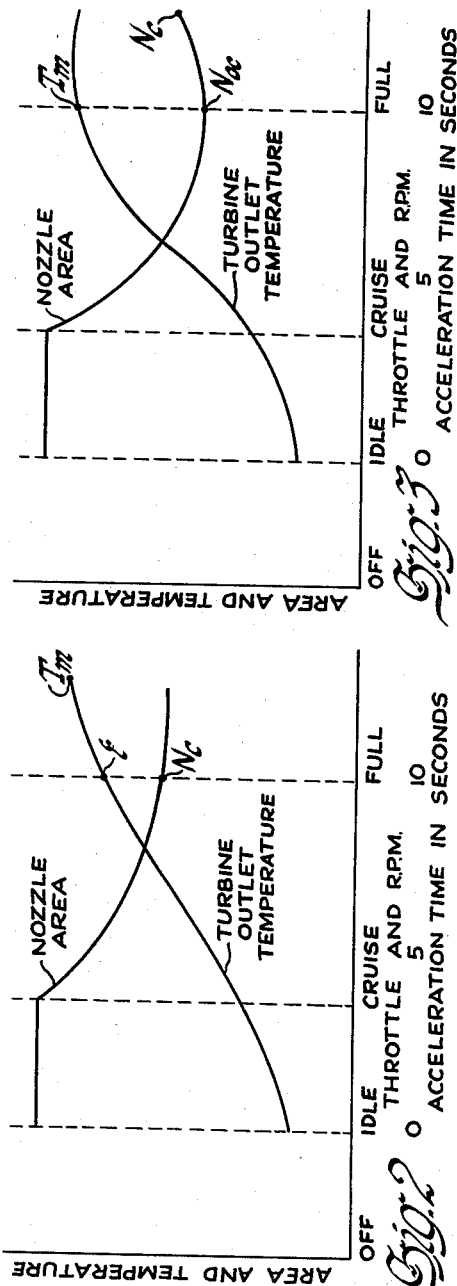
INVENTOR.
John W. Rhodes
BY
E. W. Christen
ATTORNEY

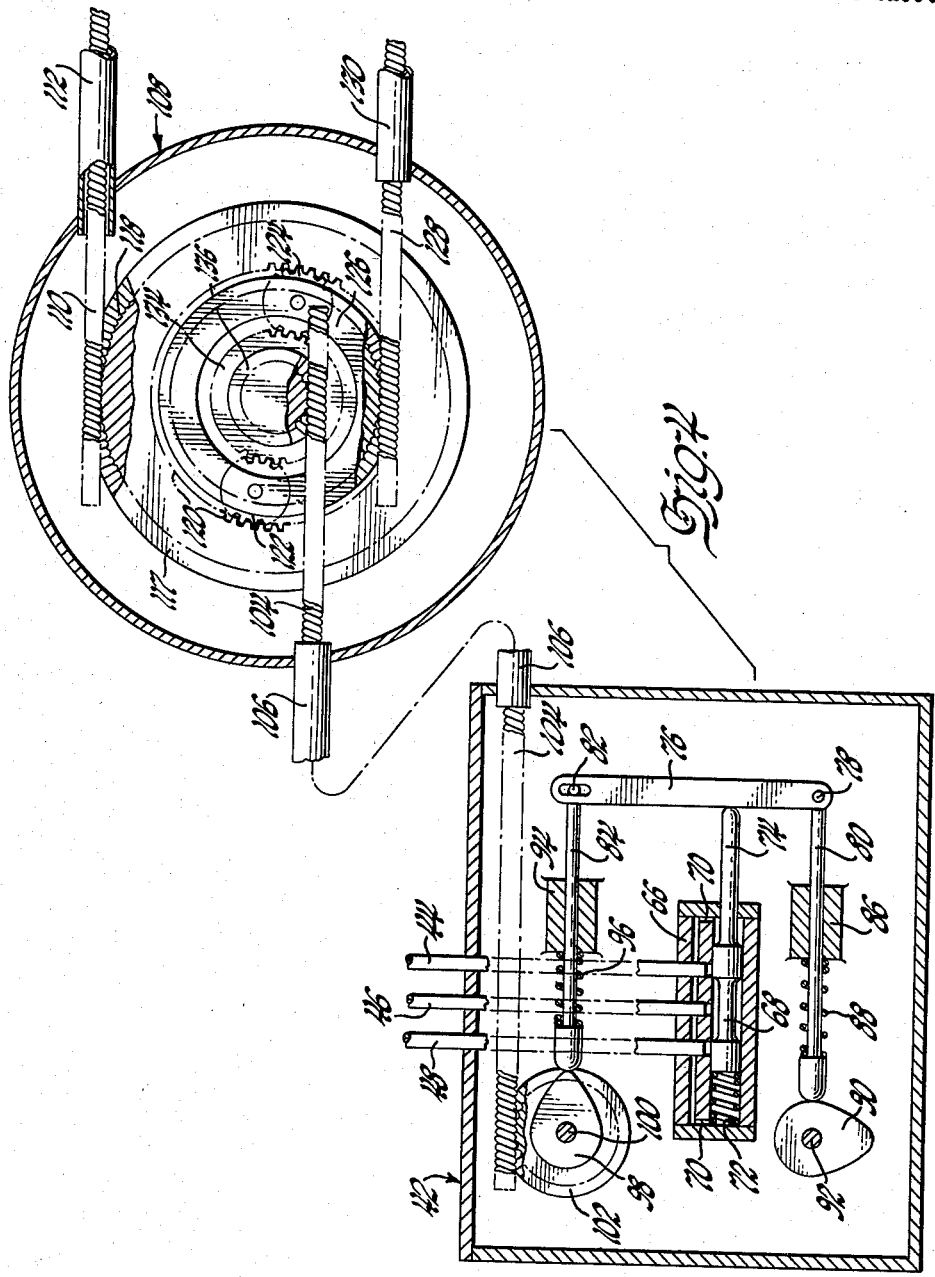

United States Patent Office 2,955,412
Patented Oct. 11, 1960

2,955,412

GAS TURBINE NOZZLE CONTROL

John W. Rhodes, Indianapolis, Ind., assignor to General Motors Corporation, Detroit, Mich., a corporation of Delaware Filed Jan. 17, 1957, Ser. No. 634,793

4 Claims. (Cl. 60—35.6)

This invention relates to gas turbine jet propulsion engines for aircraft and more particularly to a control for the variable area discharge nozzle of the jet pipe of such an engine.

The thrust of a turbo-jet engine depends on turbine speed and turbine outlet temperature. Turbine speed and outlet temperature depend on fuel flow and on the exhaust area of the jet pipe of the engine. More thrust is required for some conditions of aircraft operation than for others, and it is accordingly the usual practice to provide the engine with a variable area exhaust nozzle which opens at low quantity fuel flows for idle and cruise operation and which closes with increased fuel flows for higher power operations. The maximum thrust of the engine is limited by the maximum permissible turbine temperature as well as the maximum permissible speed and this consequently determines the degree of closing of the exhaust nozzle since the turbine temperature increases with increases in nozzle closing.

It is desirable to be able to accelerate a turbo-jet engine to full thrust in the shortest possible time. Conventional turbo-jet engines do not accelerate to full thrust in the shortest possible time when their throttles are opened for they reach maximum speed before they reach maximum turbine temperature, because the turbine does not heat up as fast as it accelerates. While the time lag in achieving maximum turbine outlet temperature as well as maximum turbine speed may be but a matter of seconds, it is apparent that flight conditions can occur where a slight delay in achieving maximum thrust can prove disastrous.

The invention provides a means whereby maximum turbine outlet temperature is achieved concurrently with maximum turbine speed on acceleration of the engine thus providing maximum thrust in minimum time. This is accomplished by increasing the rate of nozzle closing during acceleration to raise the rate of increase in turbine outlet temperature. Since the nozzle closing rate leads the fuel supply increase rate, it will be overclosed at the close of the acceleration period. The nozzle is therefore opened to the normal closed position after acceleration so that the turbine outlet temperature will not exceed permissible limits for an appreciable period.

In the drawings:

Figure 1 is a schematic illustration of a turbo-jet engine incorporating the jet pipe nozzle control of the invention.

Figure 2 is a graph illustrating the time lag during acceleration between maximum turbine outlet temperature and maximum turbine speed in a conventional turbo-jet engine.

Figure 3 is a graph illustrating the concurrent attainment during acceleration of maximum turbine outlet temperature and of maximum turbine speed in a turbo-jet engine having the inventive nozzle control; and, Figure 4 is a plan view, partially in section, of the nozzle control of Figure 1.

Referring now to Figure 1, a turbo-jet engine 10 of the usual compressor-combustor-turbine type discharges through a jet pipe 12, the outlet area of which is controlled by a pair of semi-cylindrical nozzle segments 14 secured to the jet pipe by pivots 16. A pair of links 18 are pivotally connected to the nozzle segments at 20 and 22 and to each other and to a piston rod 24 at 26. The piston rod 24 carries a double-acting piston 28 which is received in a hydraulic cylinder 30 to form a differential area hydraulic motor 32. When the pressure in the motor chamber 34 is sufficiently greater than the pressure in the motor chamber 36 to overbalance the differential area of the piston 28 the nozzle 14 will move to the full line open position shown. When the pressure in the chamber 34 is just enough greater than the pressure in the chamber 36 to balance the differential piston 28 the nozzle will remain in any set position. When the pressure in the chamber 34 is equal to the pressure in the chamber 36 the nozzle will move closed.

A pump 38 delivers hydraulic fluid to the chamber 34 by a conduit 40 and to a control valve 42 by a conduit 44. The control valve 42 delivers fluid to the chamber 36 by a conduit 46 and returns fluid to the pump 38 by way of a conduit 48, reservoir 50 and a conduit 52. A relief valve 54 prevents excessive pump pressure.

A conventional fuel control 56 is connected to a throttle 58 by a crank 60 and supplies fuel to the engine at increasing rates as the throttle is moved to the right. When the operator advances the throttle to the full position from idle, the speed of the engine will accelerate to maximum on a fixed schedule set by the fuel control 56. The fuel control is conventional and regulates fuel flow in accordance with engine speed, compressor temperature and compressor pressure in the usual manner. The control valve 42 has a crank 62 which is engaged by the end 64 of the throttle when the throttle reaches cruise position and the crank is rotated 90° counterclockwise as the throttle advances from cruise to full speed position. The control valve 42 regulates the delivery of fluid to the motor 32 to close the nozzle 14 as the throttle goes from cruise to full speed position; that is, the nozzle closes to increase turbine outlet temperature as engine r.p.m. increases due to increased fuel flow to achieve greater thrust.

Referring additionally to Figure 4, the control valve 42 is a conventional type follow-up mechanism that is common to various types of hydraulically operated mechanisms. It includes a valve cylinder 66 and a spool valve 68 which controls the flow of fluid in the conduits 44, 46 and 48. In the position shown, the spool valve 68 has cut off communication between the conduits 44, 46 and 48 whereby fluid pressure to the motor 32 through the conduit 40 to the chamber 34 holds the nozzle 14 in the open position. Movement of the spool valve 68 to the right from the position places the conduits 44 and 46 in communication thereby applying equal fluid pressure to both sides of the differential piston 28 of the motor 32 to move the nozzle 14 in closing direction. Movement of the spool valve 68 to the left to return to the position shown closes off the conduits 44 and 48 from the conduit 46 and thereby traps pressurized fluid in the chamber 36 of the motor 32 to retain the nozzle 14 in a particular closed or semi-closed position. Movement of the spool valve 68 to the left from the position shown places the conduits 46 and 48 in communication to vent the chamber 36 of the motor 32 to the reservoir 50 to return the nozzle 14 to open position.

The valve cylinder 66 includes a passage 70 which serves to provide substantial hydraulic balance for the spool valve 68 and a compression spring 72 that urges the spool valve to the right. The spool valve 68 has an actuating pin 74 which engages a floating lever 76 that has a pivotal connection 78 at its lower end with a rod 80 and a slidable pivot connection 82 at its upper end with a rod 84. The rod 80 is slidably supported by a boss 86 and is urged to the left by a compression spring 88 into engagement with a cam 90 that is connected to the shaft 92 of the crank lever 62. The rod 84 is slidably supported by a boss 94 and is urged to the left by a compression spring 96 into engagement with a cam 98 that is pivotally supported at 100 and that mounts a peripherally toothed sheave 102. The toothed sheave 102 is engaged by a helically wound push-pull cable 104 to form a rack and pinion arrangement whereby shifting of the cable 104 to the right rotates the cam 98 in a clockwise direction. A conduit 106 slidably supports the cable 104 in the usual manner and leads it to an integrator 108.

Before considering the integrator 108 it can be seen that movement of the throttle 58 from cruise to full speed position will operate the fuel control 56 to increase the rate of fuel supply and will also operate the spool valve 68 to close the nozzle 14. Full opening movement of the throttle rotates the cam 90 90° in counter-clockwise direction thereby shifting the rod 80 to the right and swinging the lever 76 counterclockwise about the slidable pivot 82. The spring 72 shifts the spool valve 68 to the right and places the conduits 44 and 46 in communication to close the nozzle.

The cable 104 is connected through the integrator 108 and a follow-up push-pull cable 110 to the nozzle 14 to be shifted to the right with the nozzle as the nozzle closes. Movement of the cable 104 to the right in an amount sufficient to rotate the cam 98 90° clockwise will shift the rod 84 to the left in a sufficient amount to swing the lever 76 about the pivot 78 in a counterclockwise direction to thereby return the spool valve 68 to the null position shown. It is thus seen that the nozzle position is controlled in accordance with the position of the cams 90 and 98 and that if the cable 104 were to be directly connected to the nozzle that the degree of nozzle closure would be in direct dependence on the position of the speed cam 90 since the cam 98 would act as a direct nozzle movement follow-up.

Figure 2 is illustrative of what would occur during acceleration were the cable 104 to be movable solely in response to nozzle position. Opening of the throttle 58 would increase r.p.m. and would decrease the nozzle area in direct dependence on r.p.m. increase so that in 10 seconds the nozzle would be in the normally closed position ($N_c$) but the turbine outlet temperature would be at a temperature ($t$) somewhat below the maximum permissible turbine outlet temperature ($T_m$) which would not be achieved until slightly after 10 seconds. Full thrust is therefore not had in the shortest possible time since maximum turbine outlet temperature is not achieved until after full r.p.m. is achieved. It should be apparent that the turbine outlet temperature curve would be raised if the nozzle area curve were lowered, and that this would provide a means for attaining ($T_m$) concurrently with attainment of maximum engine r.p.m. Merely lowering the nozzle area curve would not, however, solve the problem for the turbine temperature would then rise above ($T_m$) after full r.p.m. was achieved. The less obvious, but correct, solution to the problem is to provide a means to increase the rate of nozzle closing relative to the rate of r.p.m. increase during acceleration so that the nozzle will be overclosed when maximum speed is reached (thereby achieving maximum turbine outlet temperature concurrently with full r.p.m.) and to thereafter open the nozzle slightly to the normal closed position to prevent excessive turbine outlet temperatures.

Figure 3 is a graphical representation of the correct manner of controlling nozzle area during acceleration and in accordance with the means provided by the invention. On viewing Figure 3 it is seen that the nozzle exceeds its normal closed position ($N_c$) in 10 seconds to an overclosed position ($N_{oc}$) to bring the turbine temperature to ($T_m$) within 10 seconds and that the nozzle thereafter opens slightly to ($N_c$) to prevent excessive turbine outlet temperatures. The integrator 108 in conjunction with the control valve 42 provides the means for achieving this correct control of nozzle area.

Referring again to Figures 1 and 4, a conduit 112 having an expansion loop 114 is secured at one end to the integrator and at the other end to the jet pipe 12 by a bracket 116. The follow-up cable 110 is slidably received in the conduit 112 and is connected to the nozzle 14 at 115 and engages a toothed sheave 117 in the integrator 108. The cable 110 is helically wound to engage teeth 118 which are formed in the periphery of the sheave 117 so that the cable and sheave operate as a rack and pinion whereby nozzle closing movement rotates the sheave clockwise and nozzle opening movement rotates the sheave counterclockwise. The sheave 117 is provided with internal spur teeth 120 which engage a pair of planetary gears 122, 124 that are pivotally mounted in a ring-like planetary carrier 126. The planetary carrier 126 is peripherally toothed to engage a push-pull cable 128 which is slidably mounted in a conduit 130 that is secured at one end to the integrator and at the other end to the jet pipe 12 by a bracket 132. Expansion of the jet pipe between the points A and B will shift the cable 128 to the right to rotate the planetary carrier 126 counterclockwise.

The planetary gears 122, 124 engage a sun-gear 134 which carries a peripherally toothed sheave 136 which engages the cable 104 that also engages the sheave 102 of the cam 98. The epicyclic gear train arrangement is such that movement of the cable 110 with the cable 128 fixed brings about a corresponding movement of the cable 104 and, similarly, that movement of the cable 128 with the cable 110 fixed brings about a corresponding movement of the cable 104. In the example shown, the drive to the cable 104 from the cable 110 is at a 1–1 ratio, and from the cable 128 at a 4–1 ratio but these ratios can be changed.

The mechanism described utilizes the jet pipe of the turbo-jet engine as a temperature-sensitive power device that reflects changes in turbine outlet temperature with a slight time lag since time is required for the jet pipe to pick up additional heat from the exhaust gas during acceleration to reflect actual turbine outlet temperature. In other words, the turbine outlet temperature will increase as the engine is accelerated and the temperature of the jet pipe will likewise increase, but with a slight lag in time. The expansion and contraction of the jet pipe is measured by the cable 128 and is fed to the control valve 42 through the integrator 108. The cable 110 measures the degree of nozzle closing and feeds this information to the control valve through the integrator. The conduit 112 carrying to cable 110 is provided with the loop 114 to prevent the expansion of the jet pipe from giving a false indication of nozzle position. The conduit 112 is fixed to the jet pipe at either end and as the jet pipe expands the loop 114 flattens out and accordingly provides an increase in the effective length of the cable 110 so that the cable will not shift due to axial translation of the nozzle.

Operation of the mechanism is as follows:

When the throttle 58 is shifted to the right to accelerate the engine it engages the crank 62 at cruise position and rotates the cam 90° counterclockwise in moving to the full speed position. The spool valve 68 shifts to the right powering the motor 32 to close the nozzle. As the nozzle closes the cable 110 shifts to the right and shifts the cable 104 to the right through the epicyclic gear train of the integrator. The jet pipe heats and expands but the expansion lags the increase in turbine outlet temperature. The expansion of the jet pipe shifts the cable 128 to the right and also shifts the cable 104 to the right through the integrator. The arrangement is such that the cam 98 is rotated considerably less than 90° clockwise when the nozzle reaches the normal closed position ($N_c$) with the jet pipe not yet fully expanded;

that is, the cam 98 lags the cam 90 during acceleration. The nozzle accordingly overcloses to ($N_{oc}$) for the cam 98 is still lagging the cam 90 when the cam 90 has been rotated 90° to the full speed position. This overclosing of the nozzle, as shown by Figure 3, results in a concurrent arrival of maximum turbine outlet temperature and maximum speed. With full r.p.m. and ($T_m$) achieved, the jet pipe acquires sufficient heat to obtain full expansion and the cam 98 finishes its 90° clockwise rotation. This final rotation of the cam 98 powers the motor 32 to open the nozzle from the overclosed position ($N_{oc}$) to the normal closed position ($N_c$) and thereby retains the turbine outlet temperature at a permissible level.

While the nozzle control provides momentary overclosure for quick accelerations it is also advantageous in that it does not provide overclosure during slow accelerations. If the engine is accelerated at a very slow rate there is no appreciable time lag between increasing turbine outlet temperature and increasing expansion of the jet pipe. In this event, the cam 98 does not lag the cam 90 whereby overclosing of the nozzle is prevented.

While the embodiment of the present invention as herein disclosed constitutes a preferred form, it is to be understood that other forms might be adopted.

I claim:

1. In combination with a gas turbine jet propulsion engine, a fuel control, a jet exhaust pipe, a variable area nozzle at the discharge end of the jet pipe, power means to adjust the area of the nozzle, means for sensing the thermal expansion of the jet pipe, and control means for the power means including means operated in accordance with the setting of the fuel control and means operated by the expansion sensing means, the expansion sensing means including an epicyclic gear train operably connecting the jet pipe and nozzle with the control means.

2. In combination with a gas turbine jet propulsion engine, a fuel control, a jet exhaust pipe, a variable area nozzle at the discharge end of the jet pipe, a fluid power actuator to adjust the area of the nozzle, an integrator, a fluid control valve to operate the actuator, and an operating means for the control valve including first means operated by the fuel control and second means operated by the integrator, the integrator having means for following the area variation of the nozzle and having means for following the size variation of the jet pipe, the integrator comprising an epicyclic gear train having planet, sun, and ring gears, the train operably connecting the control valve operating means and the nozzle area following means and the jet pipe size following means.

3. The combination of a gas turbine jet propulsion engine including an exhaust jet pipe and a variable-area nozzle at the discharge end of the jet pipe, a fuel control for the engine including settable engine power control means, power means connected to the nozzle to adjust the area thereof, means responsive to the setting of the power control means, means responsive to the thermal expansion of the jet pipe, means responsive to nozzle area, and means additively coupling the three said responsive means to the said power means throughout the normal engine power range normally employed in flight so constructed that power-increasing movement of the power control means, increase in nozzle area, and decrease in jet pipe temperature all actuate the power means in the direction to close the nozzle.

4. The combination of a gas turbine jet propulsion engine including an exhaust jet pipe and a variable-area nozzle at the discharge end of the jet pipe, a fuel control for the engine including settable engine power control means, power means connected to the nozzle to adjust the area thereof, means responsive to the setting of the power control means, means responsive to the thermal expansion of the jet pipe, and means additively coupling the two said responsive means to the said power means throughout the normal engine power range normally employed in flight so constructed that power-increasing movement of the power control means and decrease in jet pipe size both actuate the power means in the direction to close the nozzle, and the range of variation of nozzle area responsive to setting of the power control means is substantially greater than the range responsive to jet pipe size, the response of nozzle area to propulsive jet temperature normally lagging the response to the power control means as a result of the inherent time lag between changes in jet temperature and the resulting changes in jet pipe temperature.

References Cited in the file of this patent

UNITED STATES PATENTS

| 2,596,012 | De Brey | May 6, 1952 |
| 2,648,191 | Featonby | Aug. 11, 1953 |
| 2,697,326 | Featonby | Dec. 21, 1954 |

FOREIGN PATENTS

| 527,575 | Canada | July 10, 1956 |
| 1,061,753 | France | Dec. 2, 1953 |